US005625523A

United States Patent [19]

Nedriga

[11] Patent Number: 5,625,523

[45] Date of Patent: Apr. 29, 1997

[54] SURGE ARRESTER

[76] Inventor: Walter N. Nedriga, 1511 Brogdon St., Savannah, Ga. 31406

[21] Appl. No.: 415,855

[22] Filed: Apr. 3, 1995

[51] Int. Cl.[6] .......... H02H 1/00

[52] U.S. Cl. .......... 361/127; 361/117

[58] Field of Search .......... 361/116, 117, 361/118, 126, 127

[56] References Cited

U.S. PATENT DOCUMENTS

| | | | |
|---|---|---|---|
| 4,812,944 | 3/1989 | Eberhard et al. | 361/127 |
| 5,050,032 | 9/1991 | Thevenet et al. | 361/117 |
| 5,138,517 | 8/1992 | Raudabaugh | 361/117 |
| 5,291,366 | 3/1994 | Giese et al. | 361/127 |

*Primary Examiner*—Jeffrey A. Gaffin
*Assistant Examiner*—Ronald W. Leja

[57] ABSTRACT

A fragmentation resisting core unit adapted for installation within a surge arrester outer housing and including a conventional array of non-linear core components arranged in series along a core axis between the inner faces of a pair of end terminals with adjoining faces of the array subjected to sufficient compressive force that the compressed core array is electrically conductive. This core array under compression is circumscribed by a plurality of untensioned, high tensile strength annular bands of an insulant longitudinally circumscribing the compressed core array in mutually transverse planes with each reinforcing band extending longitudinally of the compressed electrically conductive core array in a manner to overlie the outer end face region of each end terminal in a closely adjoining relationship.

14 Claims, 3 Drawing Sheets

SURGE ARRESTER

BACKGROUND OF THE INVENTION

My invention relates to a surge arrester and, more particularly, to a fragment resisting surge arrester core unit for installation in a surge arrester weather housing of elastomeric or other type of weather resisting material. Many varieties of surge arresters are known and are in use for connection in parallel with electrical equipment across a source of electrical power and the ground to shunt high current resulting from high voltage power surges such as those created by lightning. The shunting circuit of these surge arresters basically comprises an elongated, electrically conductive core between the terminal ends of which are contained a series of non-linear resistor elements, which commonly comprise metal oxide varistor blocks, stacked in series with or without intervening metal spacer heat sink blocks, a variety of electrical components, and one or more compression springs maintained in compression so as to maintain the core elements in electrical contact with each other. The electrically conductive core containing non-linear resistor elements is normally enclosed within an outer weatherproof housing commonly comprising various types of elastomeric material.

A long existing problem with surge arresters has been the explosive fragmentation of the core components due to the high pressures created by gases generated within the core by the passage through the core of high shunting currents when unusually high voltage surges are generated in the electrical power source by lightning or other phenomena. The high pressures generated within the core are caused by the heating of contained gases or air and the vaporization of the metal components of the core. The explosive fragmentation of the core ruptures the arrester housing and the hot fragmentations of the core components become widely scattered and often cause injuries to personnel or damage to equipment in the vicinity, in addition to being the source of fires.

Many solutions have been proposed and utilized to contain this explosive fragmentation of the arrester cores such as: installing reinforced metal bands around the outer weatherproof housing of the arrester; circumscribing the core varistor elements with heat conducting electrically insulating collars maintained in contact with the outer housing to dissipate the heat in the manner of U.S. Pat. No. 4,218,721; incorporating pressure relief diaphragms at the ends of the arrester cores in the manner of U.S. Pat. Nos. 3,727,108, No. 4,001,651, No. 4,240,124 and No. 4,404,614; encasing the arrester core of electrically conductive elements within a shell of high strength, fragment resistant, insulating material, such as resin impregnated fiberglass, in the manner of U.S. Pat. Nos. 4,404,614 and 4,851,955; enclosing the arrester core of electrically conductive elements within a spiral winding of highly tensioned, non-conductive filaments in a manner as places the respective portions of the arrester core under a high degree of axially directed compression in the manner disclosed in U.S. Pat. Nos. 4,656,555 and 4,905,118; enclosing the arrester core of electrically conductive elements within a rigid tube of high strength, insulating material having elongated regions of weakened areas extending longitudinally of the tube through which weakened areas high pressure gases generated by voltage surge created high shunting currents are vented in the manner of U.S. Pat. No. 4,930,039; enclosing the arrester core of electrically conductive elements in a jacket of plastic impregnated bi-directionally oriented weave fabric of which the greater strength strands of the biaxially oriented fabric extend longitudinally of the core and the lesser strength strands of the other orientation extend circumferentially of the core with a constrictive band compressively circumscribing the terminal ends of the core in the manner disclosed in my U.S. Pat. No. 5,047,891 in which the nature of the bi-directionally oriented fabric jacket opens longitudinally slits in the jacket when abnormally high pressures are generated within the core through which slits the internal gas pressure is vented before reaching destructive intensity.

As discussed at some length in my U.S. Pat. No. 5,047,891, incorporated herein by reference, the prior art core fragmentation resisting construction are deficient in establishing integrity of the core in the longitudinal direction, which deficiency the construction described in my aforesaid patent overcomes by the bi-directionally oriented weave fabric of the jacket having a higher degree of longitudinal tensile strength as compared to the lesser circumferential strength which results in slits opening longitudinally along the sides of the jacket through which high internal core pressures are vented. Although the longitudinally slitted fiberglass core enclosing jacket of U.S. Pat. No. 4,930,039 does provide means for venting high pressure gases generated in the core elements by high shunting currents, the slitted fiberglass jacket affixed at its ends to the core terminal ends is not a structure in which the vented jacket provides a high degree of longitudinal integrity to the core as would resist longitudinal explosion of the core. The manner by which the jacket is affixed to the core is deficient in shear strength.

SUMMARY OF THE INVENTION

An object of my invention is to provide a reinforced central core unit for a surge arrester which will minimize fragmentation of the core when the surge arrester is subjected to abnormally high voltage surges.

Another object of my invention is to provide a surge arrester central core unit having a very high longitudinal integrity when subjected to abnormally high voltage surges.

Still another object of my invention is to provide a means of establishing a high degree of integrity to non-jacketed arrester cores.

A further object of my invention is to provide a simple and inexpensive central core unit for containment in a surge arrester housing having a high degree of longitudinal integrity as will cause the core conductive components to split longitudinally, opening longitudinally extending slots through which high pressure gases generated by abnormally high voltage surges can escape to minimize fragmentation of the core.

These objects are achieved by my present invention which produces the same results as my U.S. Pat. No. 5,047,891 of relieving core high pressures generated by high shunt currents through slots that open lengthwise of the core and vent the pressure creating gases. In the more simple and less expensive structure of my invention, a conventional array of non-linear core components arranged in series along a core axis between the inner faces of a pair of end terminals with adjoining faces of the array subjected to sufficient compressive force that the compressed core array is electrically conductive is circumscribed by at least a pair of untensioned, high tensile strength annular bands of an insulant extending around the compressed core array in mutually transverse planes. Each reinforcing band extends longitudinally of the compressed electrically conductive core array in a manner to overlie the outer end face region of each end terminal in a closely adjoining relationship. In a preferred embodiment of my invention, the core array containing at least one compression spring is maintained in compression by a plurality of elongated straps extending longitudinally of the exterior of the core array with respective ends of each strap affixed to the sides of respective end terminals with the springs displaced into compression.

DETAILED DESCRIPTION OF THE INVENTION

Figure 1:
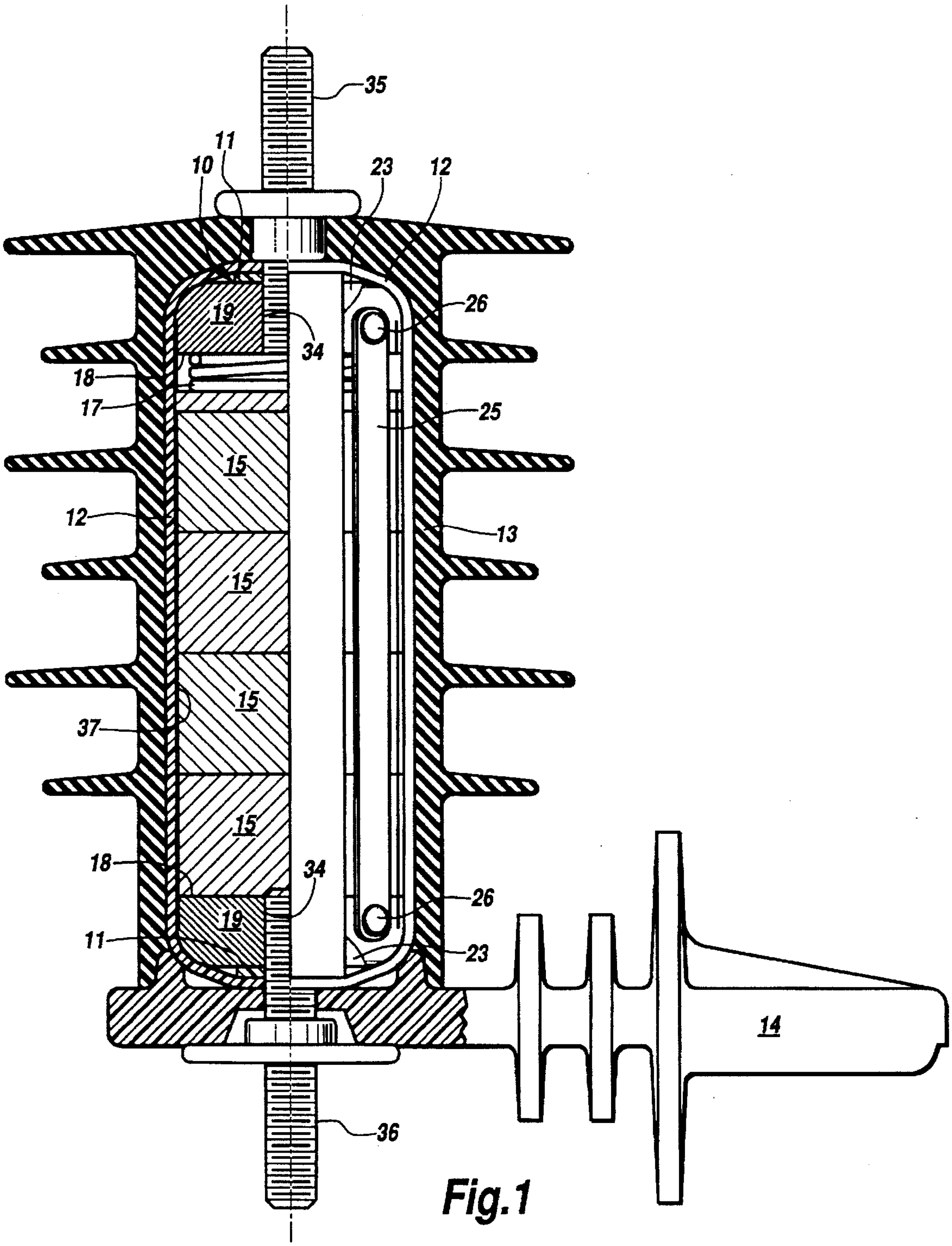
FIG. 1 is a side elevation view partially in section of the assembled surge arrester core unit contained within a housing mounted on a base.
Figure 2:
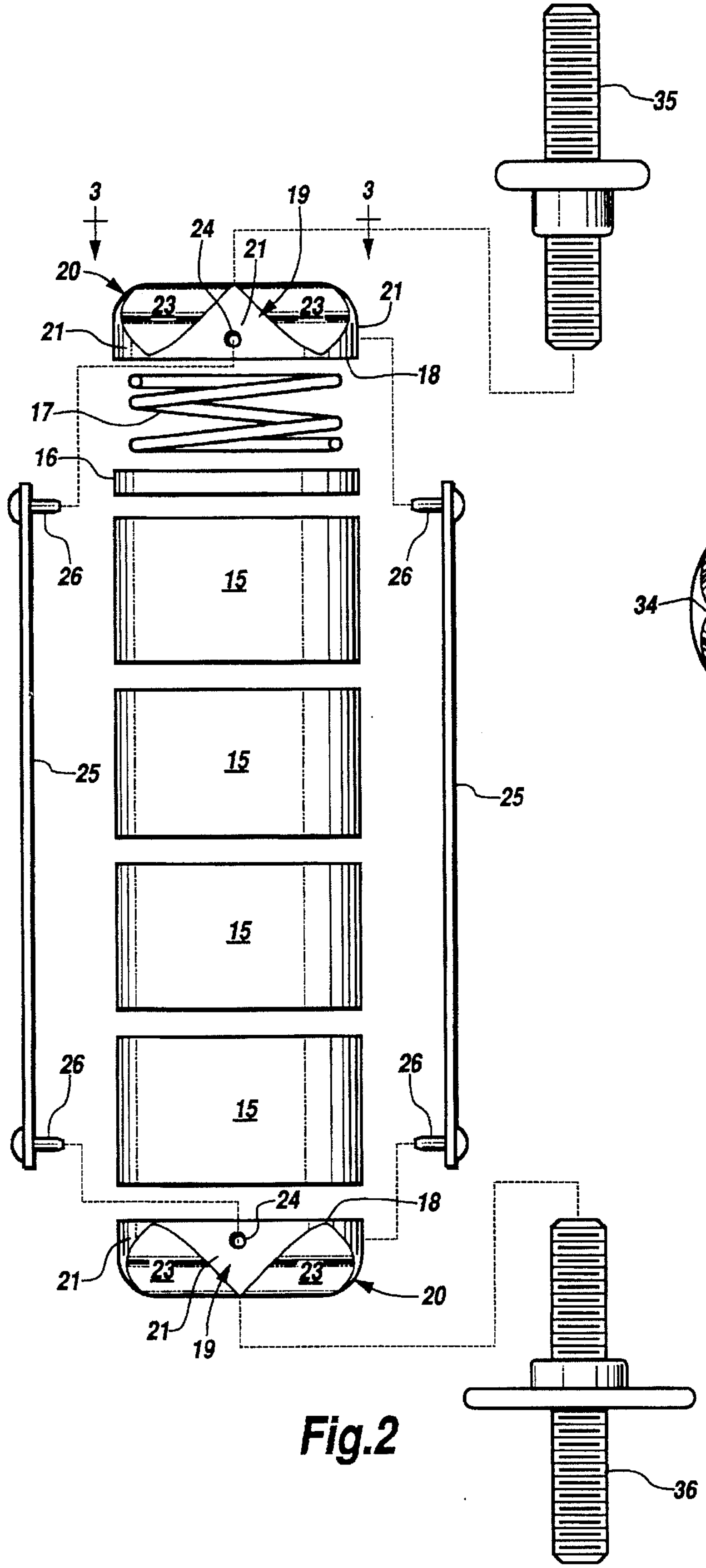
FIG. 2 is an exploded side elevation of components comprising one preferred embodiment of a compressible core of the invention.
Figure 8:
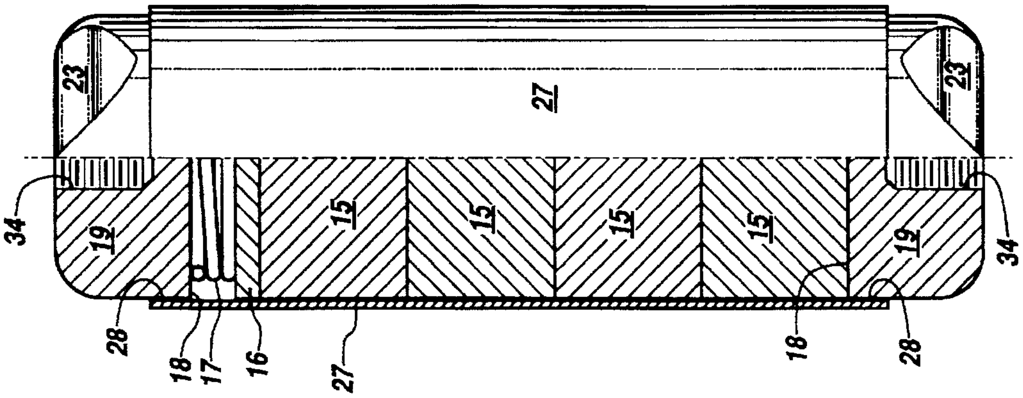
FIG. 8 is a side elevation partially in section of another embodiment a compressed core of the invention.

The assembled surge arrester illustrated in FIG. 1 comprises an elongated, compression biased central core array 10 circumscribed by a pair of untensioned, annular reinforcing bands 11, 12 contained within the interior of a weather housing 13 supported on a base mounting 14. Referring further to FIGS. 2 and 8, the components of the central core array 10 comprise a plurality of non-linear resistor blocks 15, typically metal oxide varistors, metal washers 16 and the like, and one or more compression springs 17 or similar compression biasing means arranged in series between the respective end inner faces 18 of each of a pair of end terminals 19. The central core array components of non-linear resistor blocks 15, washer 16, compression spring 17 and end terminals 19 are maintained under compression in a range of approximately 20 to 70 pounds in establishing electrical contact between the core array component adjoining faces such that the compressed central core array 10 provides an electrical current path between end terminals 10 when the voltage applied across the end terminals exceeds the impedance breakdown voltage of the non-linear resistors.

Figure 3:
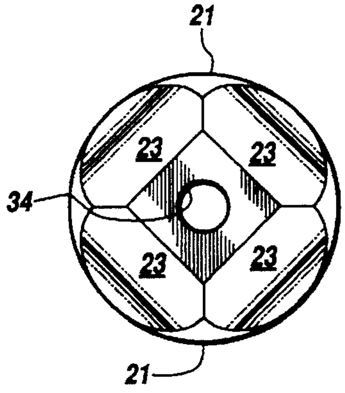
FIG. 3 is a plan view along section lines 3—3 of FIG. 2.

A preferred embodiment of the structural features by means of which the central core array components are maintained under sufficient compression to constitute an electrically conductive core array can be seen in FIGS. 1 and 2. Referring to the end terminals 19 illustrated in FIGS. 2 and 3, the outer region 20 of each end terminal 19 is defined by vertically extending side portions 21 peripherally circumscribing the end terminal below a top end face 22 with four curvilinear grooved areas 23 extending from the outer top face 22 of the end terminal downwardly around the circumferential side regions 21 of the end terminal 19 in mutually perpendicular planes transversely of the end terminal. Each end terminal side portion 21 contains a fastening hole 24 approximately midway between adjacent grooved areas 23. Four tensioning straps 25 of insulating material have pin fittings 26 at each end separated a distance equal to that between respective end terminal fastening holes 24 when an axially directed force applied inwardly of each end terminal compresses the core containing spring 17 sufficiently to establish the degree of compressive contact between core array component adjoining faces as is necessary for the core array to constitute an electrically conductive array. The strap fitting pin 26 and fastener holes 24 are respectively dimensioned to constitute a tight interference fitting. Whereas the described embodiment utilizes four straps symmetrically located about the circumference of the core array a larger number of straps could obviously be utilized. An alternative embodiment of the structural features by which the central core array components can be maintained under sufficient compression for the core array adjoining faces to establish adequate electrical contact is illustrated in FIG. 8 in which the end portions of a sleeve 27 of insulating material fitting around the core array components are affixed to the respective side portions of each of the end terminals 19 by a layer of adhesive 28 between the sleeve 27 and end terminal 19, the separation between the layers of adhesive applied between opposite end portions of the sleeve and respective end terminals being such as to establish the necessary compression in the core array. Many other structural arrangements would be obvious to the average artisan for maintaining the core array components under sufficient compression to establish electrical contact between the core components by connecting means extending between the end terminals in a manner to maintain an end terminal separation sufficient to compress biasing means contained in the core component array and maintain the desired degree of compressive force on the core array components.

Figure 6:
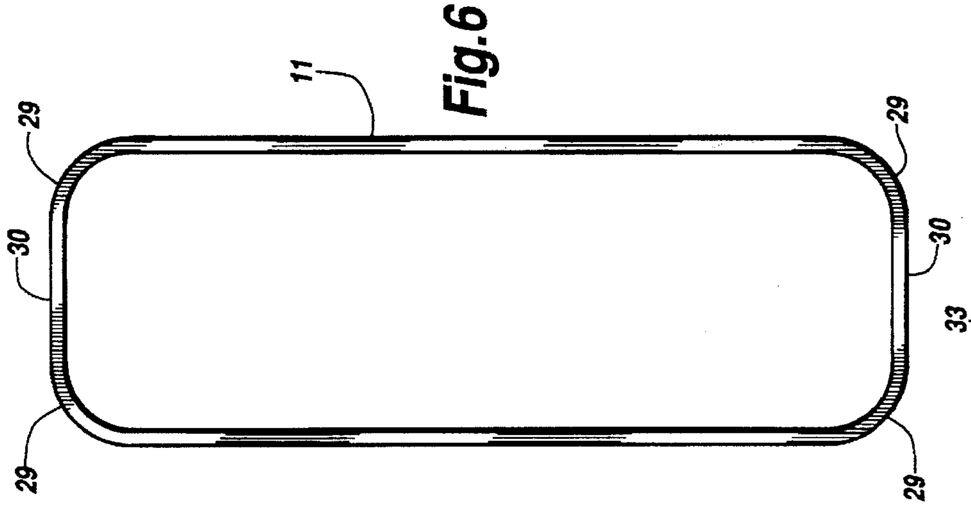
FIG. 6 is a side elevation of a core inner reinforcing strap.
Figure 7:
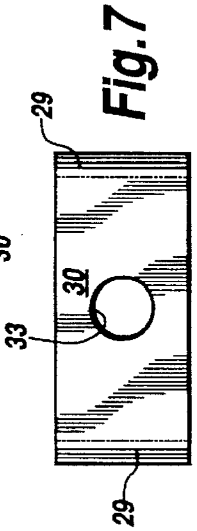
FIG. 7 is a plan end view of the strap of FIG. 6.
Figure 4:
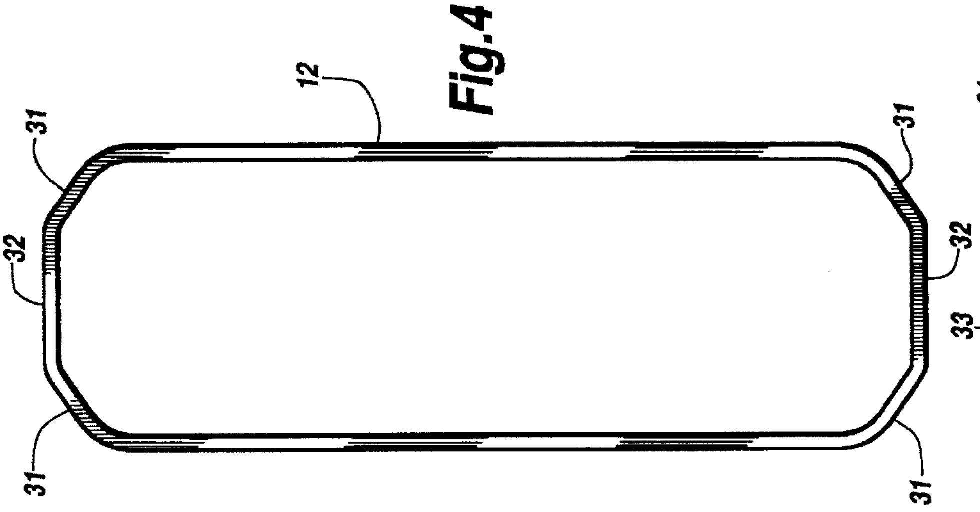
FIG. 4 is a side elevation of a core outer reinforcing strap.
Figure 5:
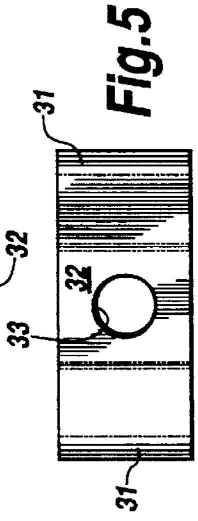
FIG. 5 is a plan end view of the strap of FIG. 4.

The previously described features of a surge arrester central core array 10 of non-linear resistors and compression springs maintained in axial compression between the inner end faces of a pair of end terminals as constitutes an electrically conductive core unit is not novel and is to be found as one of the basic components in many known surge arrester configurations. However, as discussed in the introductory portion of this application, the components comprising a core array of this basic nature and contained within a surge arrester housing will vaporize when high shunting currents occur and result in an explosive destruction of the arrester core and housing components. The novel aspect of my invention, as best seen in FIG. 1, is the placement of at least a pair of untensioned, annular reinforcing bands 11, 12 of high tensile strength insulating material around the compressed central core array 10 in mutually transverse planes such that each band longitudinally circumscribes the compressed central core array with the end portions of each band extending across the outer end face regions 20 of the respective end terminals 19 in an overlying closely adjoining relationship to the surfaces of the end terminals. A smaller diameter, inner elongated annular reinforcing band 11 of FIGS. 6 and 7 is shaped and dimensioned at its opposite ends such that the outer end regions 29 on each side of the band and the band central end region 30 conform substantially to the shape and configuration of the respective side grooved areas 23 and outer top face 22 of an underlying end terminal. Similarly, a larger diameter, outer elongated annular reinforcing band 12 of FIGS. 4 and 5 shaped and dimensioned at its opposite ends such that the outer end regions 31 on opposite sides conform substantially to the shape of underlying end terminal grooved areas 23 and the outer band central end region 32 conforms to the shape of the underlying inner band end region 30, whereby the end portions at both ends of the outer band 12 overlie the upper end regions of the end terminals and the central end region 30 of the inner band and underlying terminal outer face 22 in a closely adjoining relationship when the outer band is placed around the compressed central core unit 10 in a plane normal to that of the inner band 11 to overlie the inner band end portions as illustrated in FIG. 1. A suitable material for the reinforcing bands has been found to be 83-degree filament wound glass epoxy construction. The central end regions 30 and 32 of the respective reinforcing bands 11 and 12 each contain a centrally located hole 33 which, when installed around the compressed central core array 10, overlies a threaded bore 34 extending into the interior of each end terminal 19 into which the lower ends of threaded terminals 35, 36 are received and of which upper portions extend through the top of the weather housing 13 and the base mounting 14, respectively, in the manner illustrated in FIG. 1.

The compressed central core unit 10 along with the circumscribing reinforcing bands 11, 12 are contained within the interior of a molded weather housing 13 composed preferably of silicone-based rubber or other elastomeric material which does not shatter. Preferably the housed surge arrester is produced by placing the compressed core array 10 longitudinally circumscribed by the pair of untensioned reinforcing bands 11, 12, arranged to closely overlie the outer region 20 and outer end face 22 of each end terminal 19 in mutually transverse planes, within the central area of a weather housing mold into which silicone rubber is introduced to form the housed surge arrester unit. To prevent silicone rubber from entering into the interior of a compressed core array 10 utilizing multiple tensioning straps similar to the embodiment illustrated in FIG. 1 during the molding process, strips of electrical insulating tape 37 are overlappingly wound around the exterior of the compressed central core array 10 in the area between the end terminals 19 to form the protective sheath 37.

The structure of my invention having a plurality untensioned reinforcing bands circumferentially circumscribing the compressed central core array in a manner to closely overlie the outer end regions and outer end faces of the end terminals of the core is considerably cheaper and easier to construct than the configuration described in my U.S. Pat. No. 5,047,891 of a core enclosing jacket of plastic impregnated bi-directional weave fabric of different orientations. However, both configurations achieve the same end result of providing a sufficiently high degree of longitudinal integrity to the electrically conductive core that abnormally high pressures generated in the core by the passage of high shunting currents prevent a longitudinal expansion of the core components which results in the sides of the core components splitting longitudinally of the core in a manner to produce vent slots through which the pressure generated ionized gases vent into the interior of the surge arrester housing to relieve the pressure and provide a lower impedance ionized gas path for the current in the same manner as the configuration of my aforesaid U.S. Pat. and U.S. Pat. No. 4,930,039.

It should be understood that the foregoing disclosure describes typical preferred embodiments of my invention and that numerous modifications or alternatives may be made therein without departing from the spirit and scope of the invention as set forth in the appendant claims.

What I claim is:

1. A fragmentation resistant, reinforced core unit for a surge arrester comprising:

a central core array of components comprising a plurality of non-linear resistor elements arranged in facing series along a longitudinally extending axis between respective inner end faces of a pair of end terminals, means maintaining said core array components under an axially directed compressive force sufficient to establish contact between adjoining faces of said core components that said compressed core array is electrically conductive and a plurality of untensioned annular bands of high tensile strength insulant each longitudinally circumscribing said compressed electrically conductive core array in mutually transverse planes coincident with said core array longitudinal axis with a portion of each band overlying an outer end face region of each one said end terminal pairs in a closely adjoining relationship.

2. The reinforced core unit of claim 1 wherein said core array components include biasing means displaceable between distended and compressed states and said core array compressive force maintaining means comprises:

a length of insulant extending exteriorly of said central core array to overlie respective end terminals and means affixing opposite end portions of said insulant length to respective end terminals at locations on said end terminals in which the separation between affixing locations on opposite end terminals establishes said biasing means in said compressed state and tensions said insulant length.

3. The reinforced core unit of claim 2 wherein said tensioned insulant length comprises a plurality of straps extending longitudinally of said central core array in a spaced apart arrangement symmetrical of the circumference of said core array with respective end portions of each said strap and underlying portions of said end terminals joined by affixing means.

4. The reinforced core unit of claim 3 wherein said affixing means comprises a pin extending from said strap into the interior of said end terminal.

5. The reinforced core unit as in any one of claims 1–4 wherein said plurality of untensioned annular bands comprises a pair of bands longitudinally circumscribing said compressed electrically conductive core in mutually perpendicular planes.

6. The core unit of claim 5 wherein each said end terminal outer face region contains a pair of curvilinear grooved areas each extending transversely of and from a central top portion of said end terminal outer face region onto diametrically opposite side portions of each said end terminal outer face region in the plane of an overlying band, said grooved areas and overlying band having substantially congruent shapes.

7. The reinforced core unit of any one of claims 1–4 wherein the outer face region of each said end terminal contains a curvilinear grooved area extending transversely of said end terminal from a central portion of said end terminal outer face region onto diametrically opposite side portions of said end terminal outer face region in the plane of each circumscribing annular band, said grooved areas and the overlying band having substantially congruent shapes.

8. In a surge arrester in which an electrically conductive array of core components comprising a plurality of non-linear resistor elements stacked along a longitudinally extending axis in face-to-face electrical contact between and in electrical contact with inner end faces of a pair of end terminals is contained within a weather housing, the improvement wherein said electrically conductive core array is encompassed by a plurality of untensioned, annular reinforcing bands of high tensile strength insulant each arranged to longitudinally circumscribe said electrically conductive array in mutually transverse planes coincident with said core array longitudinal axis with a portion of each band overlying an outer end face region of each said end terminal in a closely adjoining relationship.

9. In the surge arrester of claims 8 wherein said outer end face region of each said end terminal contains curvilinear grooved areas extending downwardly from a top portion of the outer face region of each said end terminal onto diametrically opposite side areas of said end terminal outer face region in the plane of each said circumscribing untensioned annular band with said grooved areas and the overlying annular bands having substantially congruent shapes.

10. In the surge arrester of claim 9 wherein said electrically conductive array of core components includes compression spring means displaceable between distended and compressed states and means connected between said end terminals maintaining a separation between said end terminal inner end faces sufficient to displace said compression spring means into said compressed state, whereby adjoining faces of said core array components are maintained in electrical contact.

11. A surge arrester comprising:

an elastomeric weather housing having a hollow interior, a fragmentation resistant electrically conductive core unit contained within said housing, said core unit comprising a central core array of components having a plurality of non-linear resistor elements arranged in facing series along a longitudinally extending axis between respective inner end faces of a pair of end terminals, means maintaining said core array components under an axially directed compressive force sufficient to place adjoining faces of said core components into electrical contact and a plurality of untensioned bands of high tensile strength insulant each longitudinally circumscribing said compressed core array in mutually transverse planes coincident with said core array longitudinal axis with respective bands spaced apart symmetrically of the core array circumference and a portion of each band overlying an outer end face region of each said end terminal in a closely adjoining relationship.

12. The surge arrester of claim 11 wherein said core array components includes biasing means displaceable between distended and compressed states and said core array compressive force maintaining means comprises:

a length of insulant extending exteriorly of said core array to overlie outer end regions of said end terminals and means affixing opposite end portions of said insulant length to respective end terminals at locations on said end terminals in which the separation between affixing locations on opposite end terminals establishes said biasing means in said compressed state and tension said insulant length.

13. The surge arrester of claim 12 wherein said tension insulant length comprises a plurality of straps extending longitudinally of said core array in a spaced apart arrangement symmetrical of the circumference of said core array with respective end portions of each said strap and underlying portions of said end terminals joined by affixing means.

14. The surge arrester of claim 13 wherein said outer end region of each said end terminal contains curvilinear grooved areas extending downwardly from a top outer face of said end terminal onto oppositely located side areas of said end terminal outer face region in the circumscribing plane of each said untensioned annular band with said grooved areas and said end portion of said annular bands overlying said end terminal outer face region having substantially congruent shapes.

* * * * *